Patented May 2, 1939

2,156,598

UNITED STATES PATENT OFFICE 2,156,598

ACYLOXY MERCURY URETHANES

Karl Miescher, Riehen, and Karl Hoffmann, Basel, Switzerland, assignors to the firm Society of Chemical Industry in Basle, Basel, Switzerland No Drawing. Application October 12, 1935, Serial No. 44,800. In Switzerland November 3, 1934

6 Claims. (Cl. 260—431)

According to this invention new mercury compounds are made by causing an agent capable of introducing mercury to act on an aliphatic urethane which contains at least one unsaturated alkyl radical. The unsaturated radical may be linked to nitrogen or to oxygen.

The treatment with the agent capable of introducing mercury is advantageously conducted by causing to act on the urethane in aqueous or alcoholic solution a mercury salt of the formula X—Hg—X or X—Hg—OH either as such or freshly formed, X meaning the radical of a compound capable of forming metal salts, especially one belonging to the aliphatic, aromatic or heterocyclic series, for instance the radical of acetic acid, propionic acid, tartaric acid, benzoic acid, nicotinic acid or a disubstituted xanthine such as theophylline or theobromine.

When there is used a normal mercury salt of the formula X—Hg—X there is split off in the course of the reaction with the urethane an equivalent of the compound capable of forming metal salts which has to be separated from the final product. This may be avoided by using a basic mercury salt of the formula X—Hg—OH or by using one mol. proportion of mercuric oxide together with one equivalent proportion of a compound capable of forming metal salts or by using half a molecular proportion each of mercuric oxide and of a normal mercuric salt.

According to a further feature of the invention the radical of a compound capable of forming metal salts in the product, when it is not the radical of a disubstituted xanthine, as for example the acetic acid radical in N-($\beta$-acetoxy-mercuric-$\gamma$-hydroxy-propyl)-ethylurethane of the formula:

$$C_2H_5O—CO—NH—CH_2—\underset{\underset{Hg—O—CO—CH_3}{|}}{CH}—CH_2OH$$

can subsequently be replaced by the radical of a disubstituted xanthine, for example, theophylline.

The new compounds obtainable in accordance with the invention are distinguished by their diuretic and antiseptic action in combination with a good capacity for being tolerated. They are useful for therapeutic purposes.

The following examples illustrate the invention the parts being by weight:

Example 1

318 parts of mercuric acetate are dissolved in water and the solution is mixed with 129 parts of N-allyl-ethylurethane of the formula $$C_2H_5—O—CO—NH—CH_2—CH=CH_2$$

The whole is heated on the water-bath and then evaporated to dryness under a reduced pressure. There is thus obtained an oil which solidifies when triturated with ethyl acetate. The N-($\beta$-acetoxymercuric-$\gamma$-hydroxy-propyl)-ethylurethane of the formula $$C_2H_5—O—CO—NH—CH_2—\underset{\underset{Hg—O—CO—CH_3}{|}}{CH}—CH_2—OH$$

thus obtained may be recrystallised from acetone or ethyl acetate. It crystallizes in the form of needles of melting point 86–87° C. Analysis shows a mercury content of 49.37 per cent (calculated 49.4 per cent.). The new mercury compound is presumed to have the formula given above. It is easily soluble in water to a solution which is stable towards caustic soda solution even at a raised temperature.

If the same reaction is conducted in methyl-alcoholic solution instead of in aqueous solution the corresponding methyl-ether, the N-($\beta$-acetoxy-mercuric-$\gamma$-methoxy-propyl)-ethylurethane of the formula $$C_2H_5—O—CO—NH—CH_2—\underset{\underset{Hg—O—CO—CH_3}{|}}{CH}—CH_2—O—CH_3$$

is obtained. It is a light yellow oil which is easily soluble in water to a solution which is likewise stable towards caustic soda solution at a raised temperature.

Example 2

25.8 parts of N-allyl-ethylurethane, 43.2 parts of mercuric oxide and 12 parts of acetic acid are heated together with water. When the reaction is finished the solution is evaporated to dryness under reduced pressure and the radical is further treated in the manner described in Example 1.

Instead of acetic acid there may be used other organic or inorganic acids, whereby the corresponding salts are obtained.

Example 3

25.8 parts of N-allyl-ethylurethane, 43.2 parts of mercuric oxide and 36 parts of theophylline are heated together with water until reaction is finished and the solution is then evaporated to dryness under reduced pressure. There is obtained, in the form of a hygroscopic crystalline powder, a new mercury compound with a mercury content of about 38 per cent. having probably the composition:

$$C_6H_{12}O_3N—Hg—C_7H_7O_2N_4$$

The same compound is obtained by causing 13 parts of N-allyl-ethylurethane to react in aqueous solution with 56 parts of mercuric theophylline and evaporating the filtered solution to dryness under reduced pressure.

It can also be obtained by causing to react in aqueous solution 40.5 parts of the mercury compound made as described in Example 1 or 2 and 18 parts of theophylline and then evaporating the solution to dryness under reduced pressure. The corresponding theobromine compound can be made in an analogous manner.

Example 4

14.3 parts of N-allyl-*n*-propylurethane of the formula $$CH_3-CH_2-CH_2-O-CO-NH-CH_2-CH=CH_2,$$

10.8 parts of mercuric oxide and 15.9 parts of mercuric acetate are heated together with water. When the reaction is finished the solution is evaporated to dryness under reduced pressure, whereby there is obtained an oil which quickly solidifies. The new compound with a mercury content of about 48 per cent. having probably the formula:

$$C_3H_7-O-CO-NH-CH_2-\underset{\underset{Hg-O-CO-CH_3}{|}}{CH}-CH_2-OH$$

when recrystallized from ethyl acetate forms small, fine needles which melt at 81–82° C. and are readily soluble in water.

By causing 21 parts of this compound to react with 10 parts of theophylline in aqueous solution, evaporating the solution to dryness under reduced pressure and recrystallizing the radical from water there is obtained the theophylline compound corresponding with the above described mercury compound. It melts at 77–78° C. and analysis shows a mercury content of about 37 per cent. from which it is presumed that the compound has the formula:

$$C_3H_7-O-CO-NH-CH_2-CH-CH_2OH$$

(with theophylline ring structure attached via Hg)

Example 5

14.3 parts of N-allyl-isopropylurethane (boiling point under 4 mm. pressure 73–74° C.; prepared from allylamine and chloroformic acid isopropyl-ester), 15.9 parts of mercuric acetate and 10.8 parts of mercuric oxide are heated together in water until reaction is finished. The solution is then filtered and evaporated to dryness. There is thus obtained N-(β-acetoxymercuric-γ-hydroxy-propyl)-isopropylurethane with a mercury content of about 48 per cent. having the formula:

$$\underset{CH_3}{\overset{CH_3}{>}}CH-O-CO-NH-CH_2-\underset{\underset{Hg-O-CO-CH_3}{|}}{CH}-CH_2-OH$$

and forming crystals of melting point 91–92° C. The corresponding theophylline compound is sparingly soluble in water and melts at 173–175° C.

In a manner similar to that described in the foregoing examples there may also be prepared the following compounds:

N-(β-tartaroxymercuric-γ-hydroxypropyl)-methylurethane (white hygroscopic crystalline powder);
O-(β-tartaroxymercuric-γ-hydroxypropyl)-urethane (white crystalline powder which decomposes at 140° C.);
N-(β-benzoyloxymercuric-γ-hydroxypropyl)-ethylurethane (decomposing at about 103–105° C.);
N-(β-nicotineoxymercuric-γ-hydroxy-propyl)-ethylurethane (decomposing at about 220–225° C.);
N-(β-tartaroxymercuric-γ-hydroxy-propyl)-ethylurethane (decomposing at about 143° C.);
N-(β-nitroxymercuric-γ-hydroxy-propyl)-ethylurethane (white crystalline powder);
N: N-di-(β-acetoxymercuric-γ-hydroxy-propyl)-ethylurethane (decomposing at 160–164° C.);
N-(β-propionoxymercuric-γ-hydroxy-propyl)-ethylurethane (hygroscopic oil);
N-(β-acetoxymercuric-γ-hydroxy-propyl)-n-butylurethane (white crystalline powder);
N-(β-acetoxymercuric-hydroxy-propyl)-isoamylurethane (light yellow oil).

Certain of the parent materials required for preparing the above compounds have not hitherto been described; they may be made in the following manner:

N-allyl-n-butylurethane (boiling point under 3 mm. pressure 86° C.) from allylamine and chloroformic acid-n-butyl-ester;
N-allyl-isoamylurethane (boiling point under 3 mm. pressure 94–96° C.) from allylamine and chloroformic acid-iso-amyl-ester);
N,N-diallyl-ethylurethane (boiling point under 3 mm. pressure 61–62° C.) from diallylamine and chloroformic-acid-ethyl-ester.

What we claim is:

1. The urethanes of the formula $$R_1-O-CO-N\underset{R_3}{\overset{R_2}{<}}$$

wherein $R_1$ stands for a lower alkyl radical, and $R_2$ and $R_3$ stand for lower alkyl radicals which are substituted by the group acyloxy-Hg-.

2. The urethanes of the formula $$R_1-O-CO-NH-CH_2-\underset{\underset{Hg-O-acyl}{|}}{CH}-CH_2-OR_2$$

wherein $R_1$ stands for a lower alkyl radical and $R_2$ stands for a member of the group consisting of a lower alkyl and hydrogen.

3. The urethanes of the formula $$C_2H_5-O-CO-NH-CH_2-\underset{\underset{Hg-O-acyl}{|}}{CH}-CH_2OH$$

4. The urethane of the formula $$C_2H_5-O-CO-NH-CH_2-\underset{\underset{Hg-O-CO-CH_3}{|}}{CH}-CH_2-OH$$

forming white crystals soluble in water.

5. The urethanes of the formula $$\underset{CH_3}{\overset{CH_3}{>}}CH-O-CO-NH-CH_2-\underset{\underset{Hg-O-acyl}{|}}{CH}-CH_2OH$$

6. The urethane of the formula $$\underset{CH_3}{\overset{CH_3}{>}}CH-O-CO-NH-CH_2-\underset{\underset{Hg-O-CO-CH_3}{|}}{CH}-CH_2OH$$

forming white crystals soluble in water.

KARL MIESCHER,
KARL HOFFMANN.